United States Patent
Nakagawa et al.

(10) Patent No.: US 6,678,150 B2
(45) Date of Patent: Jan. 13, 2004

(54) CAPACITOR ELEMENT USING QUINOXALINE COMPOUND

(75) Inventors: Yuji Nakagawa, Tokyo (JP); Toshihiko Nishiyama, Sendai (JP); Hiroyuki Kamisuki, Sendai (JP); Gaku Harada, Tokyo (JP); Shinako Kaneko, Sendai (JP); Masato Kurosaki, Tokyo (JP); Tomoki Nobuta, Sendai (JP); Masaya Mitani, Sendai (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 10/378,520

(22) Filed: Mar. 3, 2003

(65) Prior Publication Data
US 2003/0169554 A1 Sep. 11, 2003

(30) Foreign Application Priority Data
Mar. 4, 2002 (JP) .................................. 2002-057202

(51) Int. Cl.[7] .................................................. H01G 9/00
(52) U.S. Cl. .................. 361/524; 361/523; 361/528; 361/562; 361/568; 429/213; 429/212; 429/218.1
(58) Field of Search ................... 361/524, 523, 361/528, 502, 503, 504, 512, 516, 508; 429/213, 218.1, 212

(56) References Cited

U.S. PATENT DOCUMENTS 4,702,977 A * 10/1987 Hiratsuka et al.
5,176,969 A * 1/1993 Miyabayashi et al.
5,759,714 A * 6/1998 Matsufuji et al.
6,428,928 B1 * 8/2002 Harada et al.
6,472,100 B1 * 10/2002 Maruta
6,509,116 B1 * 1/2003 Kaneko et al.

FOREIGN PATENT DOCUMENTS

| JP | 2000 260422 A | 9/2000 |
| JP | 2002 093419 A | 3/2002 |

OTHER PUBLICATIONS

Eui–Hwan Song and Woon–Kie Paik, "Properties of Polyphenylquinoxaline Acid Complex as an Electrode Material", *J. Electrochem. Soc.*, vol. 145, No. 4, Apr. 1998, 1193–1196.

J. Bettenhausen et al, "Oxadiazoles and phenylquinoxalines as electron transport materials", *Synthetic Metals*, 91, 1997, 223–228.

* cited by examiner

Primary Examiner—Dean A. Reichard
Assistant Examiner—Nguyen T. Ha
(74) *Attorney, Agent, or Firm*—Frishauf, Holtz, Goodman & Chick, P.C.

(57) ABSTRACT

An electric energy storage element is provided which contains a secondary battery or a capacitor, and which uses a quinoxaline trimer compound as an electrode active substance and a proton as a charge carrier for the trimer compound. The trimer compound includes a quinoxaline or a quinoxaline derivative.

10 Claims, 1 Drawing Sheet

CAPACITOR ELEMENT USING QUINOXALINE COMPOUND

BACKGROUND OF THE INVENTION

1. Field of the Invention

The present invention relates to an electric energy storage element and more particularly, to a secondary cell and a capacitor using a quinoxaline compound as an electrode active substance and a proton as a charge carrier.

2. Description of Related Art

An electroconductive polymer has electroconductivity and also exhibits a reversible redox reaction upon electrochemical doping, and therefore, applications thereof have been considered not only to an electroconductive material but also to an active substance for a secondary cell and a capacitor. Particularly, in the field of cells, a strong demand exists to have a high energy density and a lightweight owing to the progress of miniaturization and weight saving of communication equipments in the field of information communication. A demand of a cell increases which uses a lightweight electroconductive polymer as an active substance.

As an electroconductive polymer exhibiting a redox reaction and being used as an electrode active substance, for example, polyaniline, polythiophene, polyacetylene, polyphenylene, polypyrrole, polytriphenylamine, polypyridine, polyquinoxaline and derivatives thereof are conventionally exemplified. It has been reported by Eui-hwan song, et al. in J. Electrochem. Soc., vol. 1, pp. 1193–1196 (1998) that polyphenylquinoxaline, as one of polyquinoxaline derivatives, exhibits electroconductivity in a strong acid (such as 37% nitric acid, 70% nitric acid, 99% trifluorosulfuric acid and 96% sulfuric acid) and carries out electrical charging and discharging. The inventors have reported in JP-A-2000-260422 that in the case where a polyphenylquinoxaline represented by the following general formula (1) (wherein n generally represents an integer of from 25 to 500) is used as an anode active substance, a secondary cell having a high energy efficiency and a high weight energy efficiency and a capacitor having a high capacity can be obtained.

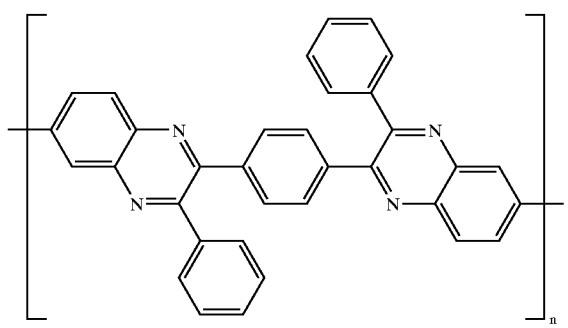

(1)

However, the energy density and the cycle characteristics are not in sufficient levels even in the case using polyphenylquinoxaline.

SUMMARY OF THE INVENTION

It is an object of the invention to provide an electric energy storage element which has a larger energy density than the case using polyphenylquinoxaline and has excellent cycle characteristics.

In the present invention, an electric energy storage element is defined by an element which can storage electric energy, that is, the element which can discharge electric energy toward an outer system and charge electric energy from the outer system, such as a secondary battery and a capacitor. According to the present invention, there is provided an electric energy storage element which contains a quinoxaline trimer compound as an electrode active substance and uses a proton as a charge carrier for the trimer compound. The quinoxaline trimer compound the timer compound consists of quinoxaline or a quinoxaline derivative.

It is preferred in the invention that the quinoxaline trimer compound has a bond between 2-positions of quinoxaline or a quinoxaline derivative.

It is also preferred in the invention that only an adsorption theory of proton of the quinoxaline trimer compound participates in electron donation and acceptance associated with a redox reaction of the quinoxaline trimer compound.

It is also preferred in the invention that the trimer compound is a compound represented by the following general formula (2):

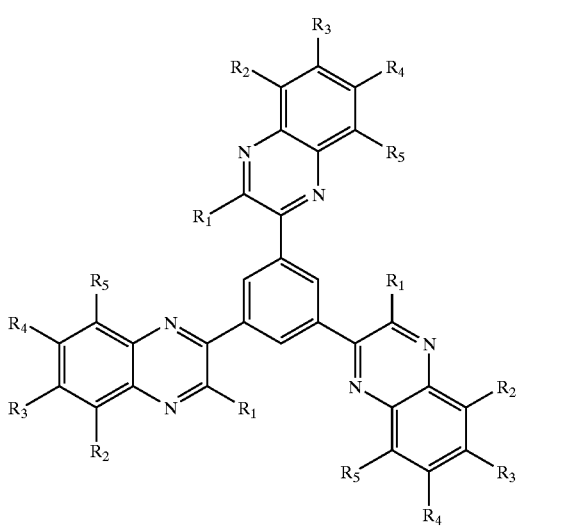

(2)

wherein $R_1$, $R_2$, $R_3$, $R_4$ and $R_5$ each independently represents a hydrogen atom or an arbitrary substituent group. In the compound represented by the general formula (2), it is preferred that $R_1$ represents a phenyl group, and at least one of the groups represented by $R_2$, $R_3$, $R_4$ and $R_5$ represents an electron donative group.

It is also preferred in the invention that the capacitor element contains an electrode containing the trimer compound in an amount of from 30 to 95% by weight, and it is also preferred that the capacitor element contains, as an electrolytic solution, a solution containing a proton in an amount of from $10^{-3}$ to 18 mol/L.

DESCRIPTION OF THE PREFERRED EMBODIMENTS

Figure 1:
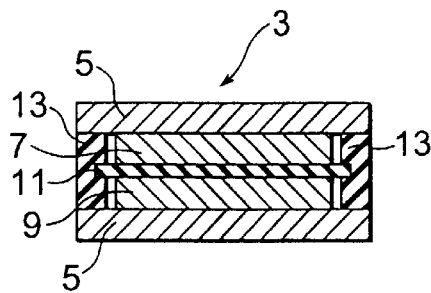
FIG. 1 is a schematic cross sectional view showing an example of a cell and a capacitor.

The invention will be described in detail.

The inventors have found that the problems caused upon using the conventional polyphenylquinoxaline as an electrode active substance are ascribed to impurities contained in the polyphenylquinoxaline. Polyphenylquinoxaline contains metallic element, as impurities, based on an oxidizing agent used for polymerization. The metallic elements bring about an oxidation reaction to cause deterioration of the active substance. Polyphenylquinoxaline is in a form of a polymer having a molecular weight distribution and thus is insoluble in a solvent, and therefore, impurities once mixed are difficult to be removed. It has been found that impurities cause a side reaction other than the redox reaction upon electrical charging and discharging to hinder manifestation of capacity, and furthermore, migration of protons in the electrolytic solution is inhibited to cause deterioration of cycle characteristics.

The quinoxaline trimer, on the other hand, contains a less amount of impurities owing to a low and constant molecular weight, a high solubility in an organic solution, a single chemical property, and convenience in purification. Furthermore, the quinoxaline trimer has a resonance structure over the main skeleton thereof, and thus it exhibits high chemical stability and is difficult to suffer degradation. As a result, the side reaction due to impurities does not occur upon electrical charging and discharging, but only the redox reaction is caused, whereby the capacity is increased, and the cycle characteristics are improved.

A preferred embodiment of the invention will be described with reference to the drawing.

As shown in FIG. 1, a secondary cell and a capacitor as an electric energy storage element 3 according to the invention have a common basic cell structure. A cathode material layer 7 and an anode material layer 9 formed on collectors 5, respectively, are arranged to face each other with a separator 11 intervening therebetween. An accumulated body obtained by accumulating the cathode material layer 7 and the anode material layer 9 through the separator 11 has, on a side surface thereof, a gasket 13 to constitute a basic cell. The cathode material layer or the cathode 7 and the anode material layer or the anode 9 are impregnated with an electrolytic solution containing a proton.

Quinoxaline or a trimer compound of a quinoxaline derivative bonded at the 2-position using as the electrode materials (hereinafter, referred to as a quinoxaline trimer) is preferably a compound represented by the following general formula (3) rather than a linear compound:

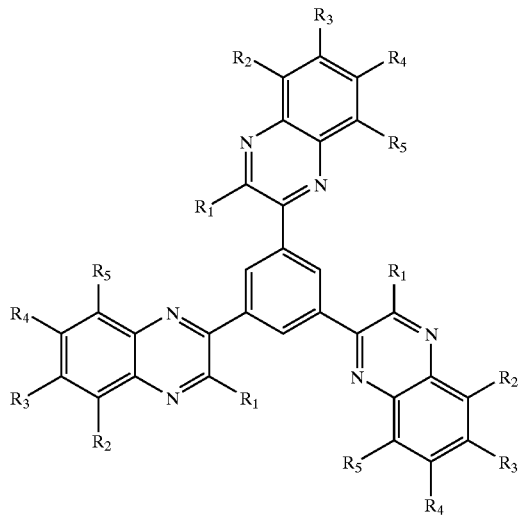

(3)

wherein $R_1$, $R_2$, $R_3$, $R_4$ and $R_5$ each independently represents a hydrogen atom or an arbitrary substituent group.

The quinoxaline trimer can be prepared from quinoxaline or a quinoxaline derivative represented by the following general formula (4) (hereinafter, referred to as a quinoxaline monomer) through a known electrochemical or chemical method utilizing a known reaction, such as an electrochemical oxidation reaction, a chemical oxidation reaction, a condensation reaction and a substitution reaction, depending on the substituent thereof, as described in J. Bettenhausen et al: "Oxadiazoles and phenylquinoxalines as electron transport materials", Synthetic Metals 91 (1997) 223–228. In general, a quinoxaline monomer having a hydrogen atom as $R_6$ at the 2-position is used for preparing the quinoxaline trimer.

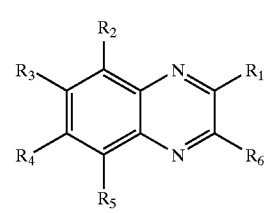

(4)

wherein $R_1$, $R_2$, $R_3$, $R_4$ and $R_5$ each independently represents a hydrogen atom, a halogen atom, a hydroxyl group, a carboxyl group, a sulfone group, a sulfuric acid group, a nitro group, a cyano group, an alkyl group, an aryl group, an alkoxy group, an amino group, an alkylthio group, an arylthio group or a heterocyclic group. Therefore, the substituents $R_1$, $R_2$, $R_3$, $R_4$ and $R_5$ in the general formula (2) are derived from the quinoxaline monomer represented by the general formula (4) used as a raw material.

Examples of the halogen atom represented by $R_n$ (n represents an integer of from 1 to 5) in the general formulae (2) and (4) include a fluorine atom, a chlorine atom, a bromine atom and an iodine atom. Examples of the alkyl group represented by $R_n$ (n represents an integer of from 1 to 5) in the general formulae (2) and (4) include a methyl group, an ethyl group, a propyl group, an isopropyl group, a n-butyl group, a s-butyl group, an isobutyl group, a t-butyl group, a n-pentyl group, a n-hexyl group, a n-heptyl group and a n-octyl group. Examples of the alkoxy group represented by $R_n$ (n represents an integer of from 1 to 5) in the general formulae (2) and (4) include a group represented by —OX, wherein examples of the group represented by X include those exemplified for the alkyl group. Examples of the aryl group represented by $R_n$ (n represents an integer of from 1 to 5) in the general formulae (2) and (4) include a phenyl group, a naphthyl group, an anthryl group and a phenanthryl group. Examples of an alkyl part of the alkylthio group represented by $R_n$ (n represents an integer of from 1 to 5) in the general formulae (2) and (4) include those exemplified for the alkyl group. Examples of an aryl part of the arylthio group represented by $R_n$ (n represents an integer of from 1 to 5) in the general formulae (2) and (4) include those exemplified for the aryl group. Among these substituents, the case where $R_1$ represents a phenyl group is preferred because the redox reaction can be carried out in good conditions. It is also preferred that at least one of $R_2$, $R_3$, $R_4$ and $R_5$ represents an electron donative group, such as those exemplified for the alkyl group, because the reaction potential of the redox reaction can be lowered, which is preferred for obtaining a large capacity.

An electroconductive auxiliary agent may be added to the electrode depending on necessity for assuring electroconductivity. Examples of the electroconductive auxiliary agent include an electroconductive material, such as crystalline carbon, carbon black and graphite. In order to maintain molding property of the electrode and to fix the materials to the collector, a binder that is not corroded with the electrolytic solution, such as polyvinylidene fluoride, may be added depending on necessity.

The mixing ratio of the constitutional materials of the electrode may be arbitrarily determined as far as the desired characteristics can be obtained. Under consideration of efficiency per unit weight or unit volume, it is preferred that the amount of the quinoxaline trimer is from 30 to 95% by weight, the amount of the electroconductive auxiliary agent is from 5 to 50% by weight, and the amount of the binder is from 0 to 20% by weight.

The electrolytic solution is preferably an aqueous solution or a non-aqueous solution containing a proton as a proton is used as a charge carrier for the quinoxaline trimer. The proton concentration in the electrolytic solution is preferably from $10^{-3}$ to 18 mol/L, and more preferably from 10 to 7 mol/L. When the proton concentration is less than $10^{-3}$ mol/L, it is not preferred since the reactivity of the electrode material is lowered, and when it exceeds 8 mol/L, it is not preferred since the material is lowered in reactivity or is dissolved due to the high acidity. In order to improve the electroconductivity of the electrolytic solution, a salt, such as an alkaline metallic salt, an alkaline earth metallic salt, an organic sulfonate salt, a sulfate salt, a nitrate salt, a perchlorate salt and a borate salt, and a surfactant may be added thereto.

The separator may be a material that has electric insulation property and resistance to the electrolytic solution and has or is imparted with ionic electroconductivity, and examples thereof include a porous film, for example, formed with polyethylene or polytetrafluoroethylene, which is used after impregnation with the electrolytic solution. An electrolyte, such as a gel electrolyte and a solid electrolyte, may intervene between the electrode instead of the separator.

The quinoxaline trimer in the invention is doped with an electrochemical method or a chemical method. Examples of the dopant ion include a sulfate ion, a halogenide ion, a perchlorate ion and a trifluoroacetate ion, and it is not limited to these examples as far as the quinoxaline trimer can be doped therewith to impart electrochemical activity. For example, in the case where doping is carried out by using an electrolytic solution prepared by dissolving a sulfate ion ($HSO_4^-$) in water, the sulfate ion ($HSO_4^-$) is involved in the reaction in a hydrated form ($H_3O+HSO_4^-$), and therefore, the vicinity of the quinoxaline trimer turns into a proton excess state. When the reaction is carried out under the state, the reaction is activated to proceed the two-electron reaction associated with an adsorption theory of proton shown by the following reaction scheme. In other words, only an adsorption theory of proton of the quinoxaline trimer participates in electron donation and acceptance associated with the redox reaction of the quinoxaline trimer compound. In the case of a quinoxaline trimer represented by the general formula (2), wherein $R_1$ represents a phenyl group, and $R_2$, $R_3$, $R_4$ and $R_5$ each represents a hydrogen atom, the reaction is represented by the following reaction scheme (5), in which $X^-$ represents a dopant ion.

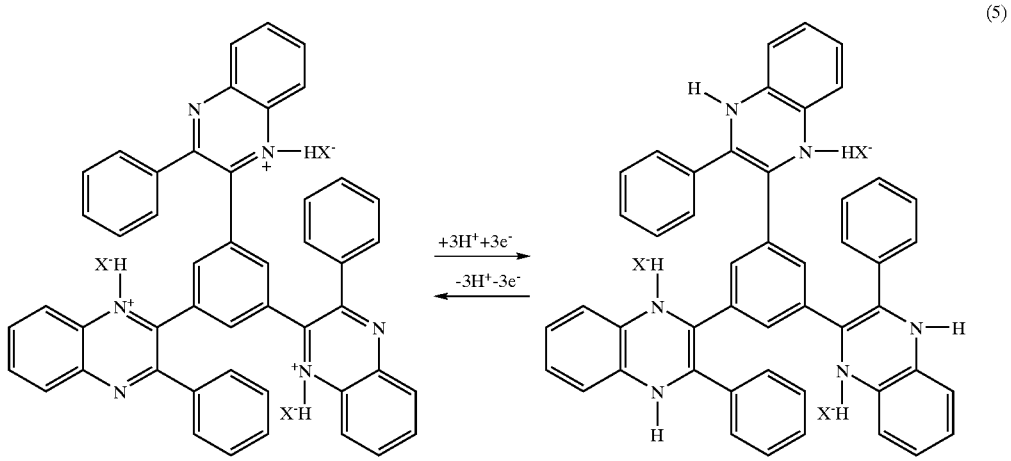

(5)

In the cell or the capacitor of the invention using the quinoxaline trimer causing the electrochemical reaction as the electrode material, because only proton is such a substance that migrates on the electrochemical reaction, the volume change of the electrodes caused by the reaction is small to obtain excellent cycle characteristics, and the mobility of proton is high to provide a high reaction rate, whereby excellent high rate characteristics can be obtained, i.e., excellent quick electric charging and discharging characteristics can be obtained. In the case where the quinoxaline trimer compound is used as the cathode, the active substance used in the anode is not particularly limited as far as it is electrochemically active and exhibits a reversible redox reaction.

EXAMPLES

While a cell according to the invention will be described in more detail below as an example, it may be constituted to have such a structure that is suitable for a capacitor by appropriately setting the capacity and the electric charging and discharging rate. In the following examples, the electric current is shown in terms of an electric current density ($mA/cm^2$).

Example 1

A cell having the structure described in the foregoing shown in FIG. 1 was produced by the ordinary method. The cathode 7 was produced in the following manner. The quinoxaline trimer represented by the following formula (6) was used as a cathode active substance. Vapor phase growth carbon was used as an electroconductive auxiliary agent. Polyvinylidene fluoride was used as a binder resin. These ingredients were mixed at a weight ratio of 75/20/5 and agitated in an automortar for 3 hours. 1 g of the resulting powder was weighed and molded under pressure to obtain the cathode. The anode 9 was produced in the following manner. Polycyanoindole (hereinafter, abbreviated as PCI) was used as an anode active substance. Vapor phase growth carbon was used as an electroconductive auxiliary agent. Polyvinylidene fluoride (with average molecular weight: 1,100) was used as a binder resin. These ingredients were mixed at a weight ratio of 75/20/5 and agitated in an automortar for 3 hours. 1 g of the resulting powder was weighed and molded under pressure to obtain the anode. As the separator 11, a porous film of polyethylene was used. As the electrolytic solution, a 40% sulfuric acid aqueous solution was used. As the gasket 13, butyl rubber was used. As the collector 5, collector rubber formed by mixing carbon black with a butyl rubber material was used.

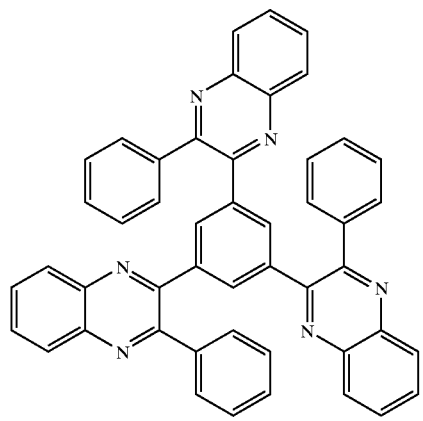

(6)

In order to evaluate the resulting cell, a cycle test was carried out by repeatedly carrying out electric charging until 1.1 V and electric discharging until 0.9 V (electric current for charging and discharging: constant current of 5 $mA/cm^2$). As a result, the energy density was 160 Wh/kg. The number of cycles until the initial capacity (energy density) was decreased to 80% was 12,000 cycles, which showed excellent characteristics. Accordingly, a cell having excellent cycle characteristics could be obtained by using the quinoxaline trimer.

Example 2

A polymer cell was prepared which had the same constitution as in Example 1 except that a PC/EC (propylene carbonate/ethylene carbonate) mixed solution having 0.1 mol of lithium perchlorate dissolved therein was used as the electrolytic solution. In Example 2, a cycle test was carried out by repeatedly carrying out electric charging until 2.3 V and electric discharging until 0.9 V (electric current for charging and discharging: constant current of 5 $mA/cm^2$). As a result, the energy density was 344 Wh/kg. The number of cycles was 12,000 cycles until the initial capacity (energy density) was decreased to 80%, which showed excellent characteristics.

Example 3

A polymer cell was prepared which had the same constitution as in Example 1 except that the quinoxaline trimer represented by the following formula (7) was used instead of the compound represented by the formula (6) used in Example 1 as the cathode active substance. A cycle test was carried out for the resulting cell by repeatedly carrying out electric charging until 1.2 V and electric discharging until 0.9 V (electric current for charging and discharging: constant current of 5 $mA/cm^2$). As a result, the energy density was 180 Wh/kg. The number of cycles was 14,000 cycles until the initial capacity (energy density) was decreased to 80%, which showed excellent characteristics.

Example 4

A polymer cell was prepared which had the same constitution as in Example 2 except that the quinoxaline trimer represented by the following formula (7) was used instead of the compound represented by the formula (6) used in Example 2 as the cathode active substance. A cycle test was carried out for the resulting cell by repeatedly carrying out electric charging until 2.3 V and electric discharging until 0.9 V (electric current for charging and discharging: constant current of 5 $mA/cm^2$). As a result, the energy density was 360 Wh/kg. The number of cycles was 14,000 cycles until the initial capacity (energy density) was decreased to 80%, which showed excellent characteristics. By using quinoxaline trimer, the cell having improved cycle characteristics was obtained.

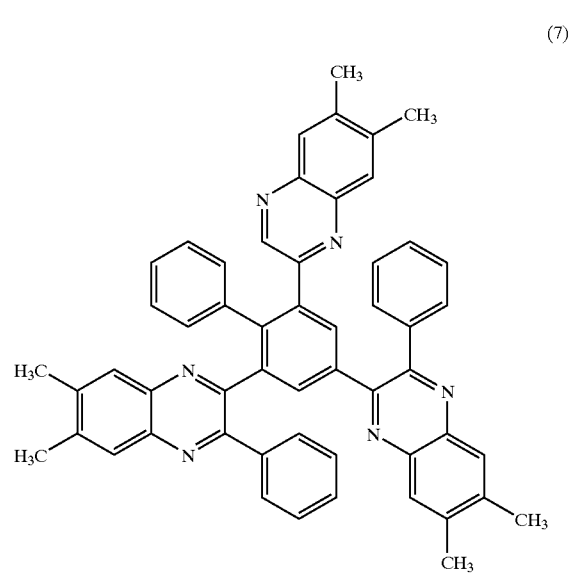

(7)

Comparative Example 1

A cell was prepared which had the same constitution as in Example 1 except that polyquinoxaline was used as the cathode active substance. The resulting cell was evaluated in the same manner as in Example 1. As a result, the energy density was 140 Wh/kg. The number of cycles was 10,000 cycles until the initial capacity (energy density) was decreased to 80%.

Comparative Example 2

A cell was prepared which had the same constitution as in Example 2 except that polyquinoxaline was used as the cathode active substance. The resulting cell was evaluated in the same manner as in Example 2. As a result, the energy density was 320 Wh/kg. The number of cycles was 10,000 cycles until the initial capacity (energy density) was decreased to 80%.

The evaluation results of Examples and Comparative Examples are shown in Table 1 below. The residual ratios of capacity in relation to the number of cycles are summarized in FIG. 2.

Figure 2:
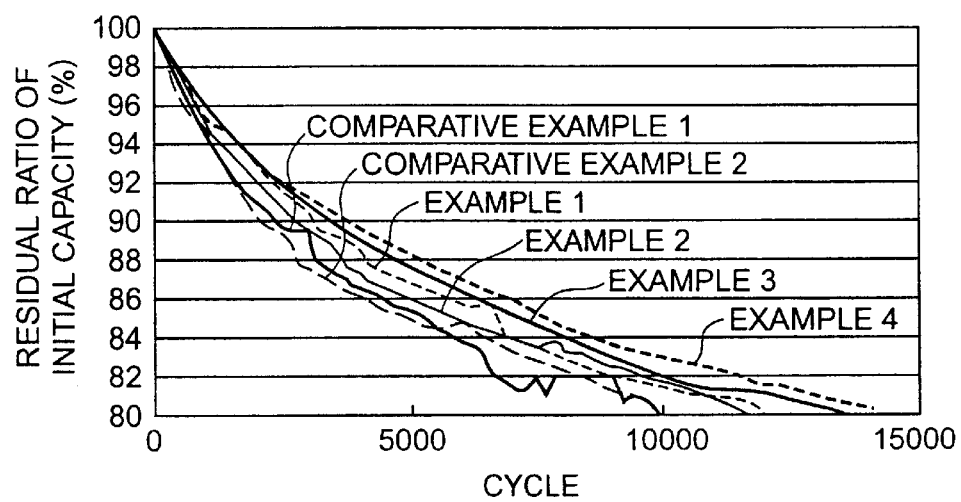
FIG. 2 is a graph showing results of a cycle test of Examples and Comparative Examples.

As shown in FIG. 2, the use of the quinoxaline trimer as the electrode active substance improves the energy density by about 10% and the cycle characteristics by 20% as compared to the case where conventional polyquinoxaline is used. The charged voltage in Example 2 is higher than that in Example 1 by 0.1 V, and the charged voltage in Example 4 is higher than that in Example 3 by 0.1 V. These are because of the differences in structures of the quinoxaline trimers used.

In other words, hydrogen atoms as $R_3$ and $R_4$ in the formula (2) are substituted with methyl groups to lower the reaction potential of causing an adsorption theory of proton represented by the foregoing reaction scheme, and thus the electromotive force (reaction potential difference between the anode and the cathode) is increased. Accordingly, it is particularly preferred that least one of the groups represented by $R_2$, $R_3$, $R_4$ and $R_5$ is an electron donative group, whereby the reaction potential can be lowered in comparison to the case where the groups are hydrogen atoms. While no comparison is made in the foregoing Examples and Comparative Examples, $R_1$ preferably represents a phenyl group because a particularly good redox reaction can be obtained in the case where $R_1$ represents a phenyl group.

TABLE 1

| | dopant | solvent | energy density (Wh/kg) | number of cycles | charged voltage (V) |
|---|---|---|---|---|---|
| Example 1 | $HSO_4^-$, $SO_4^{2-}$ | $H_2O$ | 160 | 12000 | 1.1 |
| Example 2 | $ClO_4^-$ | PC/EC* | 344 | 12000 | 2.2 |
| Example 3 | $HSO_4^-$, $SO_4^{2-}$ | $H_2O$ | 180 | 14000 | 1.2 |
| Example 4 | $ClO_4^-$ | PC/EC* | 360 | 14000 | 2.3 |
| Comparative Example 1 | $HSO_4^-$, $SO_4^{2-}$ | $H_2O$ | 140 | 10000 | 1.1 |
| Comparative Example 2 | $ClO_4^-$ | PC/EC* | 320 | 10000 | 2.2 |

*propylene carbonate/ethylene carbonate

In the invention, the quinoxaline trimer compound is used as an electrode active substance instead of polyquinoxaline, whereby the electric charging and discharging rate is also increased. The quinoxaline trimer compound is constant in molecular weight and molecular size, and is present in an electrode in a crystalline structure or an arrangement approximated thereto. Therefore, the migration path of the reactive ion (proton) is an approximately straight line to provide less decrease in mobility. On the other hand, a polymer material is in an amorphous state in an electrode, and the migration path of the reactive ion is forced to detour due to the polymer chains randomly arranged. As in this manner, when the quinoxaline trimer is used as an electrode material, migration rate of an ion and an electron is increased, the reaction rate is improved, and thus a cell having excellent high rate characteristics can be produced.

The invention is not limited to the foregoing examples. In all the foregoing example, secondary cells using the quinoxaline trimer compound as a cathode active substance are described, but they can be used as a capacitor. In the case where they are used as a capacitor, the quinoxaline trimer compound may be used as active substances of both the electrodes. The quinoxaline trimer compound of the invention preferably contains one having a bond between the 2-positions of the quinoxaline compound represented by the general formula (4), but a quinoxaline trimer compound having a bond between the 2-position and the 3-position may also be applied.

The inventor have proposed in Japanese Unexamined Patent Publication No. 2002-93419 a secondary cell and a capacitor using a trimer of an indole compound having a bond between the 2-position and the 3-position as an anode active substance. The invention is based on the finding that the use of the quinoxaline trimer compound as an electrode active substance provide a good redox reaction, and thus the invention is of different techniques from that proposed in Japanese Unexamined Patent Publication No. 2002-93419. It is also possible to obtain a secondary cell having further improved cycle characteristics by using the quinoxaline trimer compound of the invention as a cathode active substance in combination with the indole trimer compound as an anode active substance which is proposed in Japanese Unexamined Patent Publication No. 2002-93419.

As described in the foregoing, the quinoxaline trimer having a constant molecular weight and containing a small amount of impurities is used in the invention, whereby a capacitor element having a large capacity and excellent cycle characteristics can be obtained in comparison to the case where the conventional polyquinoxaline having a molecular weight distribution is used. Furthermore, the quinoxaline trimer exhibit less fluctuation in material by respective lots in comparison to polyquinoxaline, and therefore, capacitor elements can be obtained which exhibits less fluctuation in characteristics with high reproducibility. Moreover, a proton is the only substance migrating upon the electrochemical reaction, and a proton exhibits high mobility and high reaction rate, whereby excellent high rate characteristics are obtained, i.e., excellent electric charging and discharging characteristics are obtained, in comparison to the case using polyquinoxaline.

What is claimed is:

1. An electric energy storage element containing a secondary battery or a capacitor, the electric energy storage element comprising a quinoxaline trimer compound as an electrode active substance and using a proton as a charge carrier for the trimer compound, the trimer compound consisting of quinoxaline or a quinoxaline derivative.

2. The electric energy storage element as claimed in claim 1, wherein the quinoxaline trimer compound has a bond between 2-positions of quinoxaline or a quinoxaline derivative.

3. The electric energy storage element as claimed in claim 1, wherein only adsorption and desorption of protons of the quinoxaline trimer compound achieves electron donation and acceptance associated with a redox reaction of the quinoxaline trimer compound.

4. The electric energy storage element as claimed in claim 1, wherein the trimer compound is a compound represented by the following general formula (I):

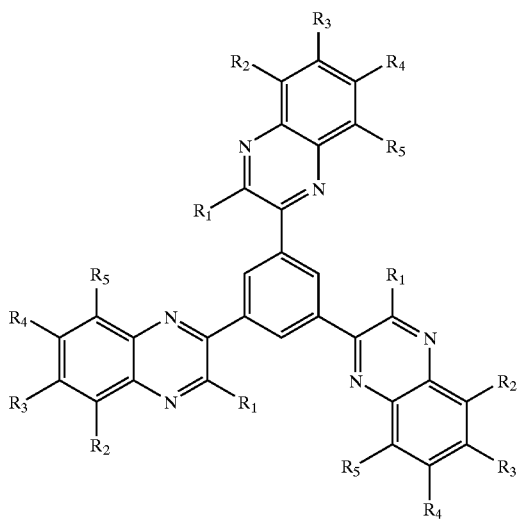

(I)

wherein R1, R2, R3, R4 and R5 each independently represents a hydrogen atom or an arbitrary substituent group.

5. The electric energy storage element as claimed in claim 4, wherein $R_1$ represents a phenyl group.

6. The electric energy storage element as claimed in claim 4, wherein at least one of the groups represented by $R_2$, $R_3$, $R_4$ and $R_5$ represents an electron donative group.

7. The electric energy storage element as claimed in claim 1, wherein the capacitor element comprises an electrode containing the trimer compound in an amount of from 30 to 95% by weight.

8. The electric energy storage element as claimed in claim 1, wherein the capacitor element contains, as an electrolytic solution, a solution containing protons in an amount of from $10^{-3}$ to 18 mol/L.

9. The electric energy storage element as claimed in claim 4, wherein the capacitor element comprises an electrode containing the trimer compound in an amount of from 30 to 95% by weight.

10. The electric energy storage element as claimed in claim 4, wherein the capacitor element contains, as an electrolytic solution, a solution containing protons in an amount of from $10^{-3}$ to 18 mol/L.

* * * * *